Figure 1:
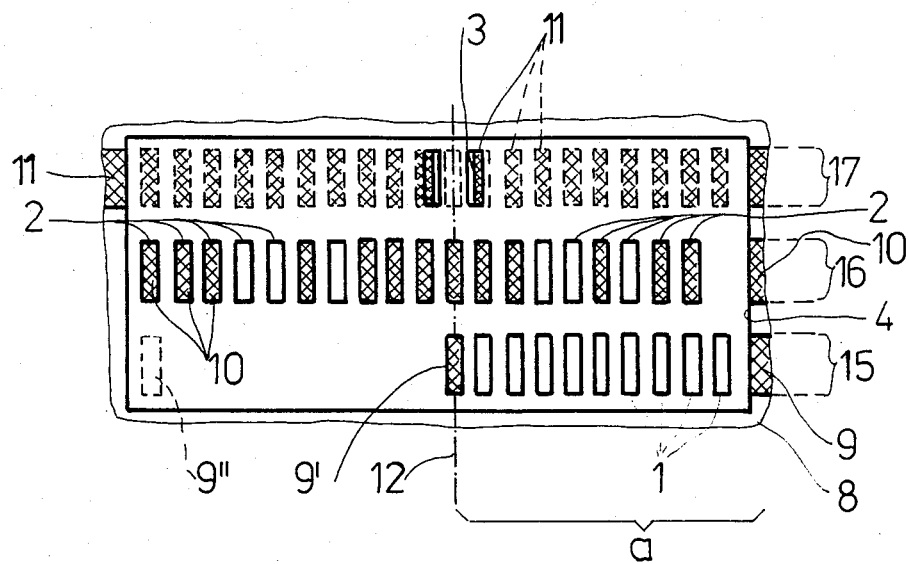

United States Patent [19]

Kebschull et al.

[11] Patent Number: 4,492,861
[45] Date of Patent: Jan. 8, 1985

[54] ARRANGEMENT FOR DETECTING THE POSITION OF AN INDEX MARK RELATIVE TO A GRADUATION

[76] Inventors: Franz Kebschull, 150, W.-Pieck-Str.,, Radeberg, District of Dresden, German Democratic Rep.; Ehrhardt Seidenschnur, H.-Matern-Str., 9,, Jena-Lobeda, District of Gera, German Democratic Rep.

[21] Appl. No.: 358,193

[22] Filed: Mar. 24, 1982

[30] Foreign Application Priority Data

May 29, 1981 [DD] German Democratic Rep. ... 230392

[51] Int. Cl.$^3$ ............................................. H01S 3/14
[52] U.S. Cl. ........................... 250/237 G; 340/347 P; 250/231 SE
[58] Field of Search ................ 250/231 SE, 237 G; 340/347 P; 356/395

[56] References Cited

U.S. PATENT DOCUMENTS 3,982,106  9/1976  Stutz ........................... 250/237 G
4,342,996  8/1982  Jannotta ....................... 250/231 SE Primary Examiner—Davis L. Willis
Assistant Examiner—Ernest Austin, II

[57] ABSTRACT

An arrangement for determining the position of an index line relative to a graduation scale, particularly for use in goniometers which operate physically is constituted of a graduation track, a code track and a pulse track, a mask is associated to said tracks having a number of openings which embody a code for a respective value of an encoded graduation mark. The counted measuring values derived from the graduation marks and from the code track are fed into a storage, for example, a shift register.

7 Claims, 3 Drawing Figures

ARRANGEMENT FOR DETECTING THE POSITION OF AN INDEX MARK RELATIVE TO A GRADUATION

The invention relates to an arrangement for the detection of the position of an index line relative to a graduated scale the division of which is constituted of regularly spaced marks in a track.

The individual marks in the graduation track are identified by a code track which is arranged in spaced and parallel relation to the graduation track.

Furthermore, a pulse track is associated to the graduation track also in spaced and parallel relation to the latter. A small distance from the plane in which the graduation track, the code track, and the pulse track are located a mask is positioned which has a plurality of openings arranged in a first, a second, and a third track each being operationally connected to the code track, to the graduation track, and to the pulse track, respectively. The first track of the mask serves to subdivide the spaces between adjacent marks of the graduation track. The mask is followed by an array of photodetectors which are associated to the graduation track, to the code track and to the pulse track via the respective tracks of the mask.

The photodetectors are sampled by a ring counter controlled by a clock pulse.

The invention serves to determine the position of an index line relative to a linear division and to a graduated circle, respectively, and is particularly useful for angular measurements. In a known graduated circle for goniometers the division lines of a code track are encoded in a dual-tetradic scale which is neighbour to the graduation track, the terms "dual" and "tetradic" are explained hereinafter.

In order to determine the actual position of a respective index mark relative to the graduated circle, that is, to enable a photoelectric reading, a light spot cyclically sweeps the reading position and, hence, the position of the index mark is photoelectrically detected on the code track which is constituted of a sequence of code lines. The use and construction of such a goniometer arrangement is disadvantageous since it requires considerable imaging optical means and analog scanning and evaluation electronics.

Furthermore, the technological realisation of a cyclically moving light spot is expensive apart from the fact that the optical, mechanical and electrical components of the goniometer render the use of the latter very complicated. In another known device, a digital photodetector matrix is used for linear measurement. This, however, is disadvantageous since the smallest measuring unit doing without an interpolator is limited by the size of and the space between the adjacently arranged photodetectors. It is an object of the present invention to obviate the above disadvantages.

It is a further object of the present invention to provide a simple and comparatively inexpensive arrangement for determining the position of an index line relative to an angular division and linear division, respectively. It is still a further object of the invention to provide an arrangement for detecting the position of an index line relative to an angular and a linear division, respectively by use of a comparatively simple encoding of the graduation marks, comprising a nondisplaceable scanning system and a considerably simple means for an electronic evaluation of the measuring position signals.

It is still a further object of the invention to provide an arrangement for determining the position of an index line relative to a graduation scale which substantially does without an optical reading system.

These and other objects are realised in an arrangement for detecting the position of an index line relative to a graduation track constituted of a first mask associated to said graduation track having as many equally spaced openings as required for subdividing the spaces between adjacent graduation marks in said graduation track. A second mask is associated to said code track which has openings in equally spaced parallel relation to the openings in said first mask. The openings in said second mask start with an opening adjacent an opening at the end of said first mask, and further openings of said second mask extend in opposite directions in parallel to the openings in said first mask. The second mask, considered from said starting opening, has a many openings in one of the two directions as required for uniquely determining each graduation mark and has, in the other of the two directions, as many openings as required to subdivide the space between two adjacent marks. A third mask is associated to the pulse track, having an even number of openings which are symmetrical to said start opening in said first aperture and staggered relative to the openings in said first and second mask. The ring counter has at least as many bit positions as there are openings in said second mask. Each bit position is associated to one of said openings in said second mask. Furthermore, at least one photodetector is associated to each opening of each mask.

The photodetectors associated to the openings of said second mask are connected via their inputs to a respective bit position of said ring counter. The outputs of all photodetectors associated to the openings of said second mask are both, connected with one another and to the series input of a storage of an output unit.

Advantageously, the code track for identifying the marks of the graduation track is constituted of ten division lines, so are the spaces between adjacent marks.

Preferably, one mask is used instead of three having three tracks of openings which renders the arrangement stable and simplifies the production and adjustment thereof. The arrangement of the openings in three tracks permits the use of a charge storage photodetector arrangement which, in turn, permits the installation of simple electronic circuits for evaluation purposes.

When the arrangement according to the invention is employed in a goniometer the photodetectors which are associated to one mask are alternately arranged in diametrical opposition on the graduated circle, which does not deteriorate the operation of the electronic evaluation circuit.

In a further advantageous embodiment of the electronic evaluation circuit the photodetectors associated to the first track and third track of openings are connected to a control circuit inserted between a clock-pulse generator and a first counter which, in turn, is connected to the output unit. Thus, a subdivision of the smallest intervals between neighboring graduation marks and the detection of the position of the index line in said intervals, respectively, is feasible to an accuracy of one tenth of the intervals. Furthermore, a second counter is connected to the clock-pulse generator via a control circuit which, in turn, is connected to the photodetectors associated to the openings of the first mask.

In a further advantageous embodiment of the invention the storage is a shift register.

If the size of the photodetectors requires, the latter are slightly displaced relative to the openings of the mask(s) so that a staged and/or staggered relative arrangement results.

Figure 2:
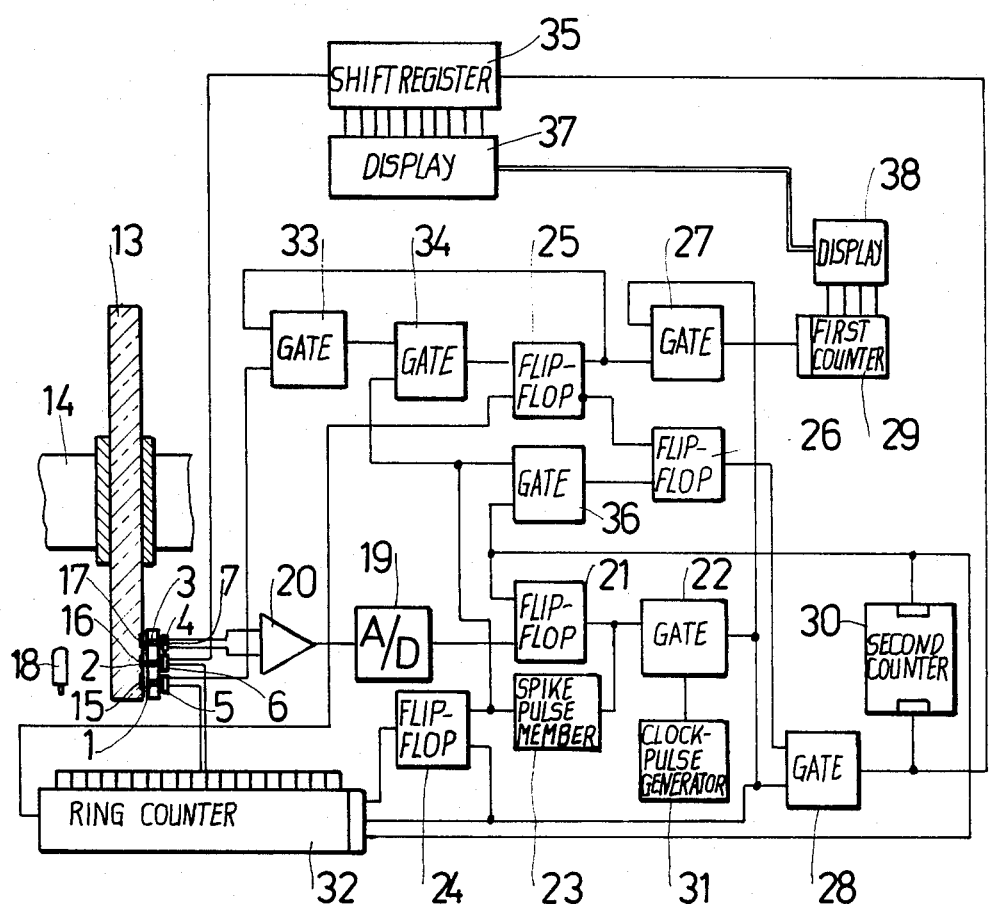
Figure 3:
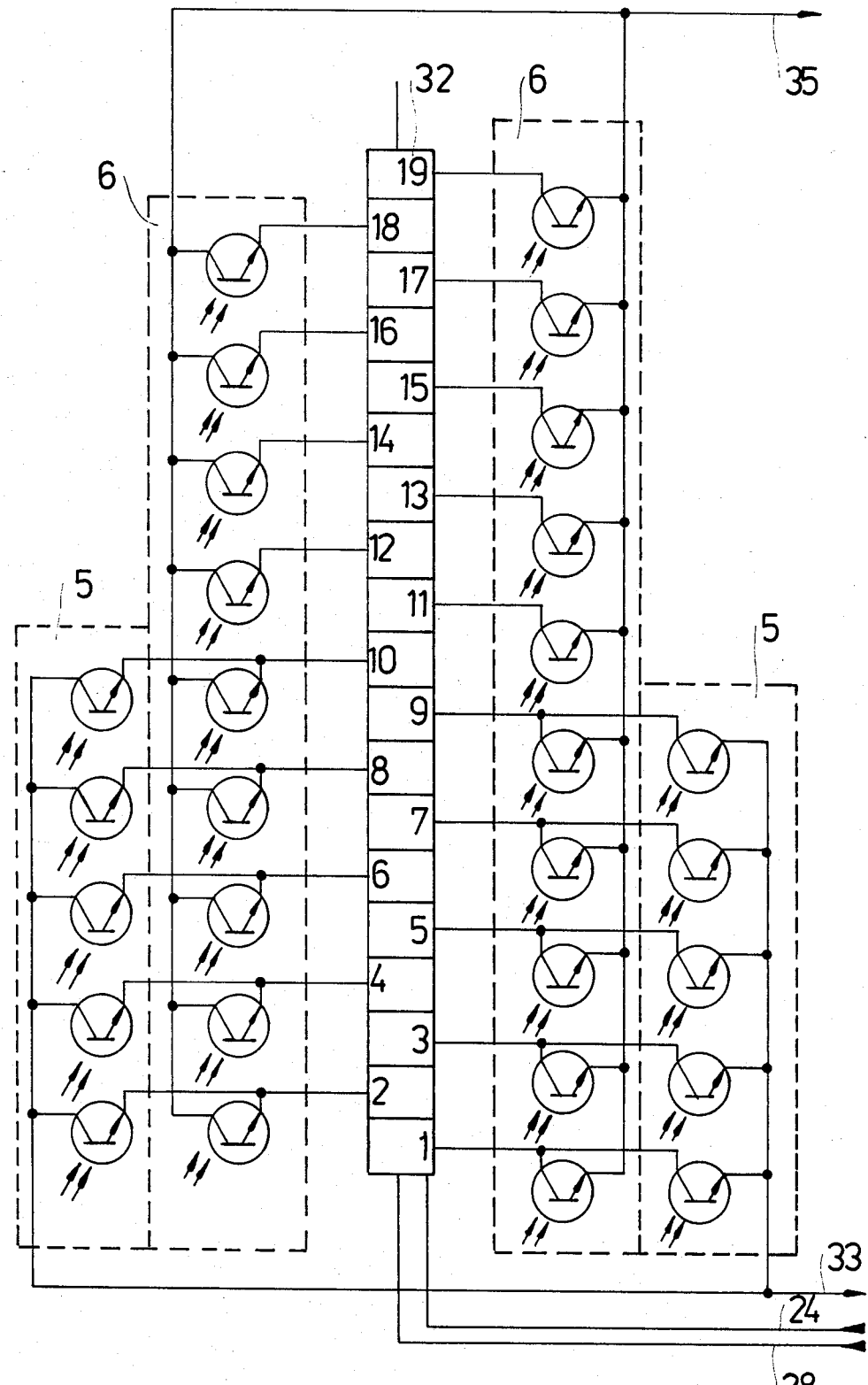

In order that the invention may be more readily understood reference is made to the accompanying drawings which illustrate diagrammatically and by way of example one embodiment thereof and where FIG. 1 is a schematic view of a mask/code arrangement, FIG. 2 a block scheme of an arrangement for reading, processing and evaluating the index line positions of a goniometer, and FIG. 3 an electronic circuit of a ring counter in combination with photodetectors.

In FIG. 1 a portion of a graduation carrier 8 is shown which is partially covered by a mask 4 (considered at right angles to the drawing plane) so that a graduation track 15, a code track 16 and a pulse track 17 are only partially visible.

The mask 4 is provided with a plurality of openings arranged in three parallel tracks one above the other, namely, a first track of openings 1, a second track of openings 2, and a third track of openings 3. In front of the mask 4 photodetectors 5, 6, and 7 are positioned which are associated to the first, second and third track of openings 1, 2, 3 and which are visible in FIG. 2, hence, ten photodetectors are associated to the respective ten openings of the first track 1, nineteen photodetectors 6 are associated to the second track of openings 2, and two photodetectors 7 are associated to the third track of openings 3.

The openings in the first and second track 1 and 2 are equally positioned, that is, the two tracks 1, 2 are in parallel to one another and neighboring openings in the first and second track are of equal size and mutual position. Furthermore, neighboring openings in the first and second track 1, 2 are equally spaced apart and the intervals between them are of equal width.

In contrast thereto the two openings in the third track 3 are wider spaced apart from one another than the openings in the first and second track, and the two openings in the track 3 are wider than those in the tracks 1 and 2. Furthermore the openings in track 3 are staggered relative to the openings in tracks 1 and 2.

The visible portion of the graduation carrier 8 shows a graduation track 15 having two marks 9 and 9' which are spaced apart by a distance a. The latter represents one degree of the goniometer graduation.

The graduation marks 9, 9' are operatively connected to the openings of the first track 1.

The openings in the second track 2 of the mask 4 are operatively connected to the code track 16, and the openings of the third track 3 of the mask 4 are operatively connected to a clock-pulse track 11.

The graduation marks 9, 9', the marks 10 of the code track 16, and the marks 11 of the clock-pulse track 17 are visible at the side portion of the graduation carrier 8 and through the openings of the first, second and third track 1, 2, 3, respectively, where the numbers refer to both, the tracks and the openings in said tracks, which, when a mark is visible through and coincides with a respective opening is indicated by respective heavy shadings. The light shadings in track 3 indicate the positions of the marks 11 in the pulse track 17, whereas a dashed line mark 9'' is a left side counterpart to the mark 9 and the dashed line indicates that the mark 9'' is not visible in the position of the carrier 8 relative to the mask 4 in FIG. 1.

An index line 12 is provided substantially in the center line of the mask 8, at right angles to the three parallel tracks 1, 2, 3.

The openings 1 are arranged to extend to the right of said index line 12. The marks 9, 9' and 9'' in the graduation track 15 represent one degree unit of the graduation, the intervals between the two degree marks 9 and 9', and 9', 9'', respectively, are subdivided by the ten openings 1 of the mask 4 into ten decidegrees.

In the second track of the mask 4 ten openings 2 are arranged to the left from the central index line 12 and eight to the right. In the third track of the mask 4 two openings 3 are symmetrically arranged relative to the central index line 12.

The graduation track 15, the code track 16 and the pulse track 17 are, for example, embodied by an opaque stripe on the transparent carrier 8, in which the individual marks in each track 15, 16, and 17 are transparent portions, but it can also be vice versa.

The openings 1, 2, and 3 in the first, second, and third track of the mask 4 simply are slots.

The angle which is to be measured by a respective device and which is indicated by the arrangement of marks in the openings of the first and second track 1 and 2 as shown in FIG. 1 is 397.0.

In the first track the mark 9' in the first opening 1 indicates the value "zero". Since the ten openings 1 represent the decidegrees a mark in the second opening 1 will represent a decidegree value "one", a mark in a third opening 3 a decidegree value "two" etc. When moved into the first opening 1 the mark 9'' will indicate the next zero position.

The marks in the openings 2 represent the degree value and since the first opening 1 of the first track carries a mark the "reading" starts with the first opening 2 in the second track. Provided that the second opening 1 of the first track has a mark, the "reading" in the second track will start with the second opening 2 (from the left) etc. Ten openings 2 are required to encode a three-digit number, since in the present case a dual-tetradic encoding is used, the first two openings 2 are the hundred, the next four (therefore "tetradic") openings 2 embody the ten and the seventh to tenth (four) openings 2 the unit. Each of the tetradic (four) openings is encoded according to the dual digit system (L or 0). Since the hundred only requires the numbers 1, 2, 3 two of the otherwise four openings are sufficient.

Accordingly, the dual number visible in the ten openings 2 from the left reads LL/L00L/0LLL where a "mark" in the second track of the mask 4 represents a logic L and no mark a logic 0. This dual number yields the decimal number 397.

Since the graduation mark 9' appears in the zero opening of the first track 1 and since the unit for angles is "gon" the reading yields 397.0 gon, which value is detected and indicated as explained hereinafter in connection with FIGS. 2 and 3.

According to the Système International d'Unités (SI), 1 gon $=(2\pi/400)=15.71$ mrad. Since 1 grade (°) $=(2\pi/360)$ rad $=17.45$ mrad, 1 grade $=(17.45/15.71)$ gon $=1.11$ gon, or 1 gon $\approx 0.9$ grade (°). Therefore, the 397.0 gon need only be multiplied by 0.9 to obtain the grade equivalent. This can be done in any suitable manner, for example, in a microcomputer.

Since the carrier 8 is displaceable relative to the mask 4 (FIG. 2) a movement of the former relative to the nondisplaceable mask 4 to the right will result in increasing angular values.

The third track 3 can comprise more than two openings, however, there must always be an even number of such openings 3. The graduation carrier 8 of FIG. 1 is shown as having straight and parallel tracks.

It is also feasible that it represents a portion of a graduated circle, then all tracks are oriented to a common center.

In FIG. 2 a graduated circle 13 is mounted on an axle 14, which is seated for rotation in not shown bearings.

The graduated circle 13 defining a first plane is provided with a graduation track 15, a code track 16 and a clock-pulse track 17.

A light source 18 is arranged in opposition to the side of the graduated circle 13 which does not carry the tracks 15, 16, 17 and, since the graduated circle 13 material is transparent the tracks 15, 16, and 17 are illuminated through the graduated circle 13 by the light source 18. The tracks 15, 16, 17 are followed by the mask 4 defining a second plane which has three tracks of openings (only laterally visible) 1, 2, 3, considered in the direction of light propagation of an illumination beam (not shown) emitted from the light source 18. The mask 4, and in particular the sequences of openings in the tracks 1, 2, 3 are followed by the photodetectors 5, 6, 7 (in a third plane) associated to the respective openings in the tracks 1, 2, 3.

The two photodetectors 7 are connected to an A/D converter 19 via an amplifier 20 which, in turn, is connected to a first flip-flop 21. Hereinafter "H" refers to logic "High" and "L" to logic "LOW" as it is common now in the field of electronics.

The two photodetectors 7 deliver a signal when they receive equal light portions from the light source 18, which is the case when the central line 12 is exactly between the openings 3 (FIG. 1) so that the openings 1, and the marks 9, and the openings 2 and the marks 10, respectively, coincide.

When the graduated circle 13 is rotated, the reading of the respective degree and decidegree values is started by a respective pulse from the A/D converter 19 which has pulse-shaped the amplified (20) photodetector 7 output. Said pulse sets the flip-flop 21 to H-potential which, both, opens a first gate 22 and sets the output of a second flip-flop 24 to H-potential via a spike pulse member 23, simultaneously, a third and a fourth flip-flop 25 and 26 are reset via the gates 34 and 36, respectively. By opening the first gate 22 a clock-pulse generator 31 feeds its clock-pulses via the gate 22 into a ring counter 32 to drive the latter. Furthermore, the clock-pulse generator 31 is connected via a gate 27 to a counter 29, and via a gate 28 to a counter 30.

By setting the flip-flop 25 and 26, the second and third gate 27, 28 which are series connected to the first counter 29 and the second counter 30 are blocked and the counting operation of the counters 29, 30 is stopped. When the gate 22 is in the ON-state, the first clock-pulse from the generator 31 shifts the H-information from the flip-flop 24 from the input of the ring counter 32 to a first position of the latter, and simultaneously the flip-flop 24 is switched so that the subsequent L-information are fed into the ring counter 32.

Thus, a first counting cycle is started.

The High information is, by the subsequent pulses from the generator 31, shifted to the last position of the ring counter 32 and simultaneously stored charges in the bases of the photodetectors 5 and 6 are extinguished.

The leading edge of the pulse in the last position of the ring counter 32 resets the counters 29, 30, the first of which counts the decidegree information from the sequence of photodetectors 5 and the second counts the signals derived from the code track 10 (FIG. 1) and delivered by the sequence of photodetectors 6. Simultaneously, a gate 33 which is series connected to the gate 34, and the gate 17 are set through the flip-flop 25. Thus, in a second counting cycle of the ring counter 32 clock-pulses are fed into the counter 29 via the gate 27 until the sampling of the photodetectors 5 through the ring counter 32 yields a pulse which indicates the position the decidegree mark 9' of the graduated circle 13, namely, that the mark 9' is detected in the first opening of the track 1, which pulse is fed to the input of the gate 33 so that the gate 27 is reset via the gate 34 and the flip-flop 25. This operation finishes the reading of the decidegrees. The inversion of the flip-flop 25 opens the gate 28 via the flip-flop 26.

The following ten clock-pulses shift the sampling information (measuring information) obtained via the counter 32 from the photodetectors 6 into a shift register 35; the measuring information are counted by the counter 30.

The tenth clock-pulse produces a transition pulse in the counter 30 blocking the gate 28 via the gate 36 and the flip-flop 26.

Thus, the reading of the degree values is finished. The information in the shift register 35 and in the counter 29 is the angular measuring value as it is shown in FIG. 1 in the openings 1 and 2 to an accuracy of a decidegree, detected by the photodetectors 5 and 6, converted into electric signals by the latter and processed by the members of the electronic circuit described and disclosed hereinbefore.

The measuring value is displayed or indicated in display units 37, 38 which include decoding circuits. In FIG. 3, the ring counter 32 is schematically shown including nineteen positions 1 to 19, which are connected to the flip-flop 24 and to the gate 28. The photodetectors 5 are parallel connected to the positions 1–10 of the ring counter 32 via their inputs, and are series connected via their outputs to the gate 33.

Similarly, the photodetectors 6 are connected to the positions 1 to 19 of the ring counter 32 and are connected with one another via their outputs and to the series input of the shift register 25.

It is also feasible to employ an already included microcounter (not shown) as a clock-pulse generator, instead of the clock-pulse generator 31.

The electronic components with the exception of the output unit (constituted of the shift register 35, the display units 37, 38), the counters 29 and 30 constitute an electronic control unit.

We claim:

1. An arrangement for detecting the position of an index line relative to a graduation, particularly for use in angle measuring devices, comprising subsequent to a light source emitting a beam and being illuminated by said beam,
a graduation carrier means defining a first plane,
a mask defining a second plane,
an array of photodetectors defining a third plane,
  said first, second and third plane being substantially in parallel to one another and substantially at right angles to said beam,
  said graduation carrier means and said mask, said mask and said array of photodetectors, respectively, being separated from one another by a narrow space, a graduation track having a definite number of marks for defining the degree values of said measuring device, the intervals between neighbouring graduation marks being equal, a code track having a definite number of marks for encoding said degree values of respective graduation marks in said graduation track, a pulse track, having a definite number of regularly arranged and spaced marks, said graduation track, said code track, and said pulse track being provided on a transparent portion of said graduation carrier means in parallel to one another substantially in said first plane, said mask having a first track of openings, a second track of openings and a third track of openings, said marks in said pulse track, said marks in said graduation track, said marks in said code track, said openings in said first, second and third tracks being substantially of equal size and geometry, said marks in said graduation track, being vertically aligned to the neighbouring marks, if any, in said code track and in said pulse track, said array of photodetectors being composed of a first sequence of photodetectors, a second sequence of photodetectors and a third sequence of photodetectors, said light source being for illuminating:

said first sequence of photodetectors through said first track and said graduation track, said second sequence of photodetectors through said second track and said code track, said third sequence of photodetectors through said third track and said pulse track, the number of photodetectors in the sequences being defined by the number of openings in the associated first, second and third track, respectively, said mask having a virtual central line being identical to said index line, and being substantially at right angles to the first, second and third track, said first track having a first or start opening in said central line and further nine openings to the right for subdividing the interval between two adjacent degree marks into decidegree units, said second track being ten openings to the left considered from said central line and eight openings to the right, said third track having at least two openings symmetrically relative to said central line, said two openings being laterally displaced relative to the openings in said second track, a ring counter, said third sequence of photodetectors feeding a starting pulse into said ring counter via circuit elements when said virtual or index line is exactly between said two openings of said third track, said ring counter being connected to said first and second sequence of photodetectors, said ring counter having at least a same number of bit positions as said second track of said mask has openings, each photodetector of said first and second sequence of photodetectors being connected via its input to a bit position of said ring counter, the photodetector of said second sequence of photodetectors being connected to one another and to a storage of an output unit, said starting pulse via said ring counter sampling said first sequence of photodetectors and feeding the sampling information to said output unit, and sampling said second sequence of photodetectors and feeding the sampling information to said output unit.

2. An arrangement as claimed in claim 1, wherein said graduation carrier means is displaceable relative to said mask along a direction defined by the tracks on said mask and on said carrier means.

3. An arrangement as claimed in claim 2, wherein said carrier means is a graduated circle being seated for rotation, said code track, said graduation mark track and said pulse track, said first, second, and third track of said mask being on circular paths having their centers in the center of rotation of said graduated circle.

4. An arrangement as claimed in claim 2, wherein said photodetectors are capable of charge storing.

5. An arrangement as claimed in claim 4, wherein said first sequence and said third sequence of photodetectors are connected to a control unit, which is inserted between a clock-pulse generator and a first counter, which, in turn, is connected to said output unit.

6. An arrangement as claimed in claim 5, wherein a second counter is connected to the clock-pulse generator via the control unit, which is connected to said first sequence of photodetectors.

7. An arrangement as claimed in claim 6, wherein said storage is a shift register.

* * * * *